3,200,096
CATALYTIC POLYMERIZATION OF TRIOXANE
Donald E. Hudgin, Summit, and Frank M. Berardinelli, South Orange, N.J., assignors to Celanese Corporation of America, New York, N.Y., a corporation of Delaware
No Drawing. Continuation of application Ser. No. 718,124, Feb. 28, 1958. This application Nov. 8, 1960, Ser. No. 67,918
4 Claims. (Cl. 260—67)

This invention relates to polymeric materials and more particularly to a method for producing a tough, high molecular weight material by the polymerization of trioxane. This application is a continuation of our application Serial No. 718,124, filed February 28, 1958, now abandoned.

In our U.S. Patent 2,989,506 we disclosed that tough high molecular weight polymers could be obtained by polymerizing trioxane in the presence of a coordinate complex of boron trifluoride with an organic compound in which an element of the group consisting of oxygen and sulfur is the donor atom.

We have now found that similar tough high molecular weight polymers may be obtained by polymerizing trioxane in the presence of a coordinate complex of boron trifluoride with water.

In one advantageous mode of operation, the polymerization takes place in molten trioxane at atmospheric pressure. However, the temperature of the reaction may vary from about −10° to about 180° C. and the trioxane may be in solid or vapor phase at the temperature extremes.

The trioxane may be polymerized as the sole monomer in the system or it may be copolymerized with minor amounts (up to about 15 mole percent) of other monomers, such as other cyclic ethers. The copolymerization of trioxane with small amounts of other cyclic ethers to obtain products of improved heat stability is disclosed in U.S. Patent 3,027,352 of Cheves T. Walling, Frank Brown and Kenneth W. Bartz.

The coordinate complex of boron fluoride may be either the monohydrate, the dihydrate or the trihydrate.

The coordinate complex of boron fluoride should be present in the polymerization zone in amounts such that its boron fluoride content is between about .001 and about 1.0 weight percent based on the weight of trioxane in the polymerization zone. Preferably, amounts between about .003 and about 0.1 weight percent should be used.

The trioxane in the reaction zone is preferably anhydrous or substantially anhydrous. While the bound water of the coordinate complex has no adverse effect, free moisture will reduce the yield and molecular weight of the polymer.

In one method of preparation, the trioxane is maintained as a molten body at a temperature between about 80 and 100° C. A measured amount of coordinate complex of boron fluoride, such as boron fluoride dihydrate may be added with vigorous stirring. The desired polymer is produced instantaneously.

Another advantageous procedure involves the polymerization of trioxane in a solution of about 10 to about 70 weight percent in a solvent, such as benzene or cyclohexane. Catalyst is added in the proportion stated above, based on the weight of trioxane in solution. The polymer comes out of solution as it is formed. A complete description of this method of procedure may also be found in our U.S. Patent 2,989,508.

In still another advantageous procedure, the trioxane is suspended in amounts between about 25 and 75 weight percent in an inert liquid such as normal decane which is at least partially a non-solvent therefor. Catalyst in the amount specified above is added and solid polymer is quickly formed in the suspended trioxane. A complete description of this method of procedure may be found in U.S. Patent 2,989,505.

The polymerization period may vary from about 30 seconds to about 4 hours, with shorter periods being associated with bulk polymerization and longer periods with solution polymerization.

The polymer, after formation, is washed clean of monomer, if any, catalyst and solvent or suspension medium if any. When there is no solvent or suspension medium one or more water washes will generally suffice. Where a solvent or suspension medium is used, the polymer is generally washed in accordance with the procedure of our U.S. Patent 2,989,509, first with a catalyst neutralizing agent, such as an aliphatic amine, then with an organic solvent such as ether, and then finally washed with water. The polymer, even after washing, contains traces of boron.

The washed polymer may be compression molded at 180° C. for two minutes, particularly after stabilization with five weight percent of diphenylamine to produce tough, molded objects.

*Example I*

Fifteen hundred grams of trioxane and 1500 grams cyclohexane were heated at 75° C. to form a homogeneous solution. There was then added 0.33 ml. $BF_3$ dihydrate catalyst. Polymer began to precipitate in 7 minutes. After three hours heating and stirring at 75° C. a heavy polymer slurry was obtained.

A 2500 gram portion of the polymer slurry was stirred one-half hour with 8.6 ml. tributyl amine at 75° C. The portion was filtered and washed twice with 2000 mil water at 90–95° C. for 15 minutes, after which it was dried overnight at 60° C. The inherent viscosity in p-chlorophenol (containing 2% α-pinene) at 0.5% concentration at 60° C. was 1.20. The polymer formed very tough discs on compression molding at 190° C. for 4 minutes.

It is to be understood that the foregoing detailed description is merely given by way of illustration and that many variations may be made therein without departing from the spirit of our invention.

Having described our invention, what we desire to secure by Letters Patent is:

1. A process for preparing tough, high molecular weight oxymethylene polymers which comprises polymerizing trioxane in the presence of a diluent by an addition of polymerization process in a substantially anhydrous reaction zone, wherein said trioxane is in contact with a catalytic amount of a preformed coordinate complex of boron fluoride with water, said complex being present in an amount such that the boron fluoride content is from about 0.001 to about 1.0 weight percent based on the weight of trioxane.

2. The process of claim 1 wherein the polymerization takes place at a temperature between about −10 and about 180° C. for a period not greater than about 4 hours.

3. The process of claim 1 wherein said coordinate complex is selected from the group consisting of boron fluoride monohydrate, boron fluoride dihydrate and boron fluoride trihydrate.

4. The process of claim 1 wherein said coordinate complex is boron fluoride dihydrate.

References Cited by the Examiner

UNITED STATES PATENTS

| | | | |
|---|---|---|---|
| 2,142,980 | 1/39 | Huijser et al. | 260—433 |
| 2,270,135 | 1/42 | Mikeska et al. | 260—67 |
| 2,713,571 | 7/55 | Gordon et al. | 260—67 |
| 2,768,994 | 10/56 | MacDonald | 260—67 |
| 2,795,571 | 6/57 | Schneider | 260—67 |
| 2,989,505 | 6/61 | Hudgin et al. | 260—67 |
| 2,989,506 | 6/61 | Hudgin et al. | 260—67 |
| 2,989,507 | 6/61 | Hudgin et al. | 260—67 |
| 2,989,509 | 6/61 | Hudgin et al. | 260—67 |
| 2,989,510 | 6/61 | Hudgin et al. | 260—67 |

OTHER REFERENCES

Walker: Formaldehyde, A.C.S. Monograph No. 120 (1953), pp. 152–153.

WILLIAM H. SHORT, *Primary Examiner.*

MILTON STERMAN, H. N. BURSTEIN, *Examiners.*